Oct. 25, 1966 D. C. WILKINS 3,281,150

TRACK SELECTOR FOR PHONOGRAPH PICK-UP

Filed Oct. 18, 1963

INVENTOR.
DANIEL C. WILKINS

BY Lyon & Lyon

ATTORNEYS

United States Patent Office 3,281,150

Patented Oct. 25, 1966

3,281,150

TRACK SELECTOR FOR PHONOGRAPH PICK-UP

Daniel C. Wilkins, Granada Hills, Calif., assignor to Spear & Wilkins, Hollywood, Calif., a partnership Filed Oct. 18, 1963, Ser. No. 317,183
2 Claims. (Cl. 274—1)

This invention relates to a track selector for phonograph pick-up or tone arms and more particularly to an indicator mechanism to facilitate accurately spotting the pick-up needle of a phonograph or tone arm in the exact track of a multiple track record when it is desired to play the particular track selected.

It is a feature of this invention that indicating means aligned accurately with the pick-up needle are placed in a visible position so that by aligning the indicating means in the exact track desired automatically the needle is also so aligned.

It is a further feature of this invention that the indicating mechanism is illuminated to further increase the facility of properly aligning the tone arm.

It is a further feature of this invention that it is an adapter usable with existing tone arms as an auxiliary attachment thereto.

These and other objects, features and advantages will be apparent from the annexed specification in which.

Figures 1, 2, 3, 4:
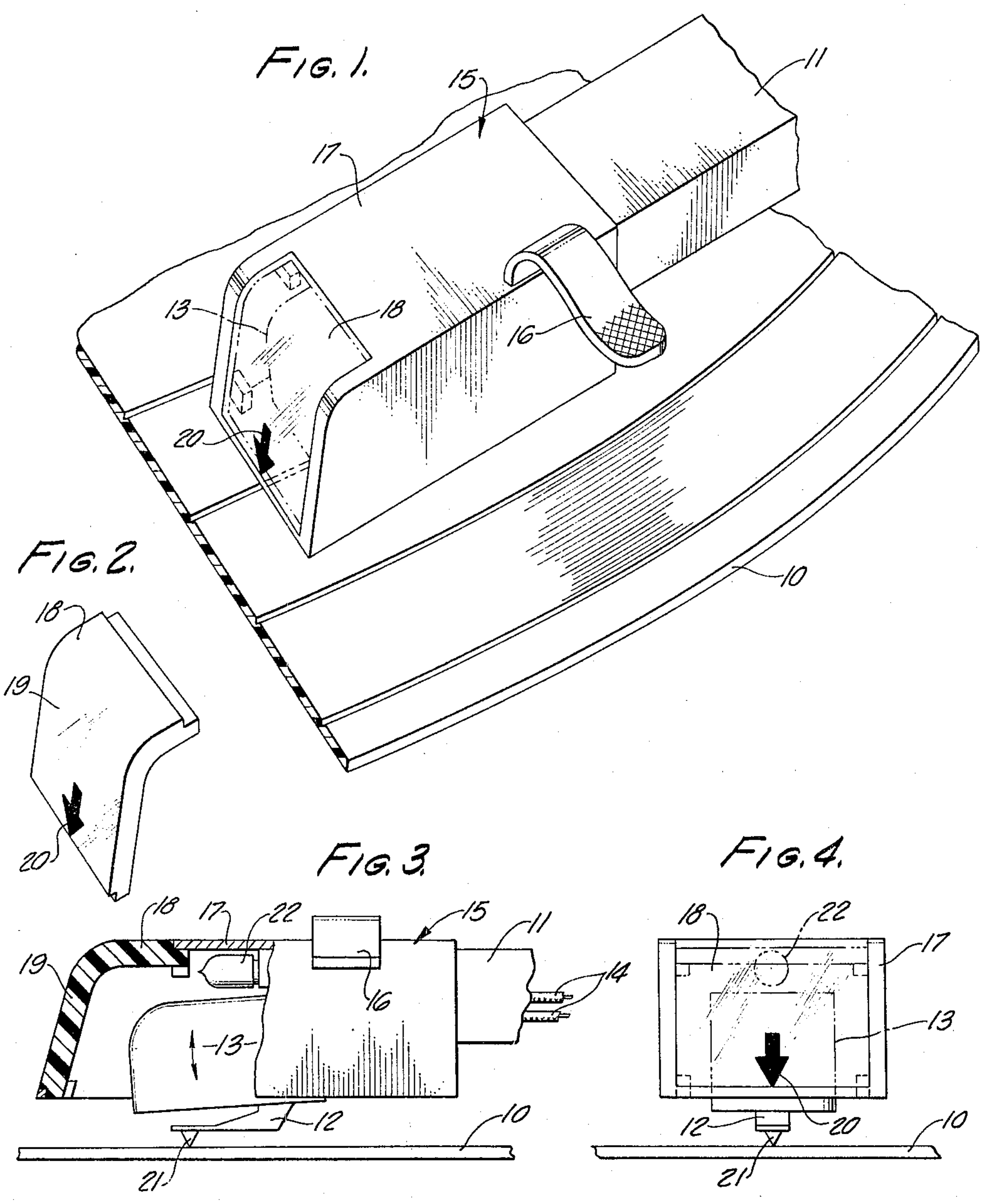
FIGURE 1 is a perspective elevation of a device embodying the present invention associated with the fragmentary elevation of a multiple track phonograph record.
FIGURE 2 is a perspective elevation of the transparent member carrying the indicating indicia.
FIGURE 3 is a side view partly in section of the invention associated with a tone arm.
FIGURE 4 is a front view of the device shown in FIGURE 3.

Referring now more particularly to the drawings, there is illustrated a multiple track record 10 over which is posed a tone arm 11. This tone arm 11 may be of any of the usual conventional forms, but conventionally consists of a pick-up needle 12 and associated mechanism 13 which rises and falls with the needle as it passes from track to track. Electric leads 14 are conventionally associated with the tone arm. The device of this invention consists of an adapter 15 which fits over the tone arm as indicated particularly in FIGURES 1 and 3 and includes a handle 16 and a channel shaped case 17. The free end of the attachment 15 has a window 18 of clear plastic, glass or the like bent downwardly as at 19 and carrying an indicating arrow 20 which is directly aligned with the point 21 of needle 12. A small illuminating lamp 22 is closed in the adapter 15 and illuminates the record and the indicator 20.

It will be appreciated that normally the needle point 21 is out of sight and one attempting to accurately locate this needle point in the desired track must do so more or less by guess. However, with the illuminated arrow 20 being visible and being aligned with the needle point, one may merely align the illuminated arrow 20 in the proper groove and the needle point 21 is automatically dropped in the proper track of the record.

While there has been described what are at present considered preferred embodiments of the present invention, it will be appreciated by those skilled in the art that various changes and modifications may be made therein without departing from the spirit of the invention and it is intended herein to cover all such changes and modifications as come within the true spirit and scope of the appended claims.

I claim:

1. A device for facilitating the positioning of a phonograph pick-up needle in a phonograph record track comprising: an attachment for a tone arm of a phonograph; said device including the visible indicating pointer; said pointer being in exact alignment with the pick-up needle of the tone arm whereby alignment of said pointer with the desired track automatically aligns said pick-up needle; said attachment including a transparent window on which said indicating pointer is carried.

2. A device for facilitating the positioning of a phonograph pick-up needle in a phonograph record track comprising: an attachment for a tone arm of a phonograph; said device including the visible indicating pointer; said pointer being in exact alignment with the pick-up needle of the tone arm whereby alignment of said pointer with the desired track automatically aligns said pick-up needle; means for illuminating said pointer; said attachment including a transparent window on which said indicating pointer is carried.

References Cited by the Examiner

UNITED STATES PATENTS

| | | | |
|---|---|---|---|
| 3,183,004 | 5/1965 | Miessner | 274—1 |

FOREIGN PATENTS

| | | |
|---|---|---|
| 232,597 | 9/1960 | Australia. |
| 37/16,075 | 10/1962 | Japan. |
| 355,622 | 8/1961 | Switzerland. |

NORTON ANSHER, *Primary Examiner.*

CLIFFORD B. PRICE, *Assistant Examiner.*